US009778360B2

(12) United States Patent
Kingdon et al.

(10) Patent No.: US 9,778,360 B2
(45) Date of Patent: Oct. 3, 2017

(54) METHOD AND SYSTEM FOR GENERATING A GEOID VIA THREE COMPUTATION SPACES AND AIRBORNE-ACQUIRED GRAVITY DATA

(71) Applicant: FUGRO EARTHDATA, INC., Frederick, MD (US)

(72) Inventors: Robert Kingdon, Fredericton (CA); Carl Sonnier, Lafayette, LA (US); Detang Zhong, Nepean (CA)

(73) Assignee: FUGRO N.V., Aa Leidschendam (NL)

( * ) Notice: Subject to any disclaimer, the term of this patent is extended or adjusted under 35 U.S.C. 154(b) by 443 days.

(21) Appl. No.: 14/572,297

(22) Filed: Dec. 16, 2014

(65) Prior Publication Data

US 2015/0226851 A1 Aug. 13, 2015

Related U.S. Application Data

(60) Provisional application No. 61/917,111, filed on Dec. 17, 2013, provisional application No. 62/092,446, filed on Dec. 16, 2014.

(51) Int. Cl.
*G01S 17/02* (2006.01)
*G01S 17/89* (2006.01)
(Continued)

(52) U.S. Cl.
CPC .......... *G01S 17/023* (2013.01); *G01S 17/89* (2013.01); *G06T 17/05* (2013.01); *G01V 7/06* (2013.01); *G01V 11/00* (2013.01)

(58) Field of Classification Search
CPC .................... G01V 7/06; G01V 7/16
See application file for complete search history.

(56) References Cited

U.S. PATENT DOCUMENTS

| 6,016,118 A | 1/2000 | Jackson et al. |
| 2003/0154060 A1 | 8/2003 | Damron |
| 2006/0036367 A1 | 2/2006 | Brewster |

FOREIGN PATENT DOCUMENTS

| KR | 10-0898617 B1 | 5/2009 |
| KR | 100898617 | * 5/2009 |

OTHER PUBLICATIONS

Translation for KR100898617.*

(Continued)

*Primary Examiner* — Luke D Ratcliffe
(74) *Attorney, Agent, or Firm* — The Marbury Law Group, PLLC

(57) ABSTRACT

Airborne gravity measurements may be added to the collection of airborne LiDAR so that it may be used to produce a digital elevation model (DEM), which may be used along with gravity data to produce an improved geoid, which may be used to produce an improved DEM based on the improved orthometric heights. A computing device may be configured to receive airborne navigation, gravity and LiDAR data, generate position information based on the navigation data, generate gravity field information based on the gravity data and the position information, generate orthometric height information based on the LiDAR data and the position information, and generate a geoid based on the gravity field and orthometric height information. The computing device may also generate a geoid model based on the gravity field and an existing DEM, and generate the orthometric height information based on the LiDAR data, position information, and geoid model.

20 Claims, 12 Drawing Sheets

(51) Int. Cl.
G06T 17/05 (2011.01)
G01V 7/06 (2006.01)
G01V 11/00 (2006.01)

(56) References Cited

OTHER PUBLICATIONS

Notification Concerning Transmittal of International Preliminary Report on Patentability for International Application No. PCT/US2014/070734 dated Jun. 30, 2016.
International Search Report from the Korean Intellectual Property Office in International Application No. PCT/US2014/070734 dated Sep. 25, 2015.
Huang, et al, "Geodetic and geophysical results from a Taiwan airborne gravity survey: Data reduction and accuracy assessment", Journal of Geophysical Research, vol. 112, B04407, pp. 1-14, (Apr. 17, 2007).
Ellmann, et al, "UNB application of Stokes-Helmert's approach to geoid computation", Journal of Geodynamics, vol. 43, No. 2, pp. 200-213, doi:10.1016/j.jog.2006.09.019, (2007).
Goli, et al., "Numerical behaviour of the downward continuation of gravity anomalies", Studia Geophysica at Geodaetica, vol. 55, No. 2, pp. 191-202, doi: 10.1007/s11200-011-0011-8, (Sep. 10, 2010).
Dzurisin, et al., "Steady subsidence of Medicine Lake volcano, northern California, revealed by repeated leveling surveys", Journal of Geophysical Research, vol. 107, No. B12, 2372, pp. ECV 8-1 to ECV 8-16; doi: 10.1029/2001JB000893, (2002).
Forsberg, et al., "An overview manual for the GRAVSOFT Geodetic Gravity Field Modelling Programs", 2nd Edition, pp. 1-75, (Aug. 2008).
Theresa Diehl, et al., GRAV-D Science Team, "GRAV-D General Airborne Gravity Data User Manual" ed., Version 1. Available Mar. 13, 2013, Online at: http://www.ngs.noaa.gov/GRAV-D/data_CS02.shtml, pp. 1-20, (2011).
GRAV-D Science Team, "Block CS02 (Central South 02); GRAV-D Airborne Gravity Data User Manual" Theresa Diehl, ed. Version 1, Available Mar. 13, 2013, Online at: http://www.ngs.noaa.gov/GRAV-D/data_CS02.shtml, (2012).
Youngman, et al., GRAV-D Science Team, "Block PN01 (Pacific North 01); GRAV-D Airborne Gravity Data User Manual" Version 1, Available Mar. 13, 2013, Online at: http://www.ngs.noaa.gov/GRAV-D/data_PN01.shtml, pp. 1-18, (2012).
Harlan, "Eötvös Corrections for Airborne Gravimetry." Journal of Geophysical Research, vol. 73, No. 14, pp. 4675-4679, (Jul. 15, 1968).
Jeleli, et al, "GPS Phase Accelerations for Moving-base Vector Gravimetry", Journal of Geodesy, vol. 71, pp. 630-639, (1997).
Kennedy, "Acceleration Estimation from GPS Carrier Phase for Airborne Gravimetry", URL: http://www.geomastics.ucalgary.ca/links/GradTheses.html, University of Calgary, UCGE Report No. 20160, pp. 1-125, (May 2002).
Kern, M, "An analysis of the combinatino and downward continuation of satellite, airborne and terrestrial gravity data." UCGE Technical Report 20172, Department of Geomatics Engineering, The University of Calgary, 193 pp. (2003).
Micro-g LaCoste, "TAGS-6 Turn-key Airborne Gravity System AeroGrav Data Processing Manual", www.microlacoste.com, pp. 1-6, (2009).
Micro-g LaCoste, "TAGS Turnkey Airborne Gravity System Specifications", (2010).
Milbert, "Documentation for the GPS Benchmark Data Set of Jul. 23, 1998" IGeS Bulletin No. 8, International Geoid Service, Milan, 14 pages, (1998).
Molodenskii, et al., "Methods for study of the external gravitational field and figure of the earth", Proceedings of the Central Scientific Research Institute of Geodesy, Aerial Photography and Mapping (TsNIIGAiK), vol. 131, Institute of Geodetic Literature. Transl. from Russian (Jerusalem, 1962), Israel Program for Scientific Translations. 3 pages, (1962).
National Oceanographic and Atmospheric Administration (NOAA) and National Geodetic Survey (NGS), The GRAV-D Project Gravity for the Redefinition of the American Vertical Datum. NOAA/NGS, Silver Spring, Maryland, U.S.A., 40 pages, (2007).
Novak, et al., "Downward continuation and geoid determination based on band-limited airborne gravity data." Journal of Geodesy, vol. 76, No. 5, doi: 10.1007/s00190-002-0252-y, pp. 269-278, (2002).
Pavlis, et al., "An Earth Gravitational Model to Degree 2160: EGM2008." Paper presented at the 2008 General Assembly of the European Geoscience Union (ESU), Vienna, Austria, 1 page, (Apr. 13-18, 2008).
Rodriguez, et al., "An assessment of the SRTM topographic products." Technical Report No. JPL D-31639, Jet Propulsion Laboratory, Pasadena, California, 143 pp., (2005).
Santos, et al., "Relation between the rigorous and Helmert's definitions of orthometric heights." Journal of Geodesy, vol. 80, No. 12, doi: 10.1007/s00190-006-0086-0, pp. 691-704, (2006).
Sun, et al., "On the discrete problem of downward Helmert's gravity continuation", Proceedings of Session G7 (Techniques for local geoid determination), Annual meeting of European Geophysical Society, The Hague, Reports of the Finnish Geodetic Institute, vol. 96, No. 2, pp. 29-34, (May 6-10, 1996).
Vanlček, et al., "Can mean values of Helmert's gravity anomalies be continued downward directly?", Geomatica, vol. 64, No. 2, pp. 245-251, (2010).
Vanlček, et al., "Determination of boundary values for the Stokes-Helmert problem" Journal of Geodesy, vol. 73, No. 4, pp. 180-192, doi: 10.1007/s001900050235, (1999).
Vanlček, et al, "The Stokes-Helmert scheme for the evaluation of a precise geoid", Manuscripta Geodaetica, vol. 19, pp. 1-16, (1994).
Vanlček, et al., "New views of the spherical Bouguer gravity anomaly." Journal of Geophysics International, vol. 159, No. 2, pp. 460-472, (2004).
Vanlček, et al., "Downward continuation of Helmert's gravity." Journal of Geodesy, vol. 71, No. 1, doi: 10.1007/s001900050072, pp. 21-34, (1996).
Vanlček, et al., "Role of 'No Topography space' in the Stokes-Helmert scheme for geoid determination." Geodetic Research Laboratory, CGU annual meeting, Banff, pp. 1-21, (May 10-14, 2003).
Véronneau, et al., "A Gravimetric Geoid Model as a Vertical Datum for Canada." Geomatica, vol. 60, No. 2, pp. 165-172, (2006).
Yang, "Early Results Towards the Canadian Geoid in the Three-Space Scenario", M.Sc. E. Thesis, Technical Report No. 229, Department of Geodesy and Geomatics Engineering, University of New Brunswick, Fredericton, New Brunswick, Canada, 171 pp., (Apr. 2005).
Yang, et al., "Atmospheric effects in three-space scenario for the Stokes-Helmert method of geoid determination." American Geophysical Union/Canadian Geophysical Union Annual Meeting, Montreal, May 17-21, 1 page, (2004).

* cited by examiner

METHOD AND SYSTEM FOR GENERATING A GEOID VIA THREE COMPUTATION SPACES AND AIRBORNE-ACQUIRED GRAVITY DATA

RELATED APPLICATIONS

This application claims the benefit of priority to U.S. Provisional Application No. 61/917,111, titled "Method and Apparatus for Preserving Detail in GEOID Computation using Three Computation Spaces and Airborne-Acquired Gravity Data" filed Dec. 17, 2013, and to U.S. Provisional Application No. 62/092,446, filed Dec. 16, 2014, titled "Method and System for Generating a Geoid via Three Computation Spaces and Airborne-Acquired Gravity Data", the entire contents of both of which are hereby incorporated by reference for all purposes.

BACKGROUND

Currently, there are a variety of systems, solutions, technologies, techniques and devices that use spatial, distance, elevation, or location information, including flood/storm surge modeling systems, drainage/water flow systems, vertical deformation monitoring systems, etc. Many such systems are used to design public infrastructures and other critical systems, and often, the safety and effectiveness of the products and solutions developed via these systems depend on the accuracy, reliability, consistency, and/or predictability of height information. For example, the use of inaccurate, inconsistent, or unreliable height information may result in inaccurate models, faulty designs, considerable and costly damage to property, or even to a loss of human lives. For these and other reasons, improved solutions for determining heights and/or generating height information will be beneficial to the general public, as well as to the corporations, governments and entities that rely on systems, solutions, technologies, techniques and devices that use geoids or height information.

SUMMARY

The various embodiments include a non-transitory computer readable storage medium having stored thereon processor-executable software instructions configured to cause a processor to perform operations that include receiving airborne navigation data, airborne gravity data and airborne LiDAR data, generating position information based on the navigation data, generating gravity field information based on a combination of the airborne gravity data and the generated position information, generating orthometric height information based on a combination of the airborne LiDAR data and the generated position information, and generating a geoid based on a combination of the generated orthometric height information and the generated gravity field information.

In an embodiment, the stored processor-executable software instructions may be configured to cause a processor to perform operations that further include generating updated orthometric height information based on a combination of the LiDAR data, the generated position information, and the generated geoid. In a further embodiment, the stored processor-executable software instructions may be configured to cause a processor to perform operations such that the operations of generating updated orthometric height information and generating the geoid based on a combination of the generated orthometric height information and the generated gravity field information are performed repeatedly.

In a further embodiment, the stored processor-executable software instructions may be configured to cause a processor to perform operations that further include generating a digital elevation model based on the generated orthometric height information. In a further embodiment, the stored processor-executable software instructions may be configured to cause a processor to perform operations such that generating the digital elevation model includes generating the digital elevation model based on a combination of the generated geoid and the generated orthometric height information. In a further embodiment, the stored processor-executable software instructions may be configured to cause a processor to perform operations such that generating the geoid based on a combination of the generated orthometric height information and the generated gravity field information includes performing a three-space method.

In a further embodiment, the stored processor-executable software instructions may be configured to cause a processor to perform operations such that performing a three-space method includes subtracting topographical effects on a gravity anomaly, converting the gravity anomaly from a first space to a second space, performing downward continuation operations on the gravity anomaly in the second space, converting the downward continued gravity anomaly from the second space to a third space, performing integration operations on the gravity anomaly in the third space to determine a virtual geoid, and converting the virtual geoid to the geoid. In a further embodiment, the stored processor-executable software instructions may be configured to cause a processor to perform operations such that the second space is a no-topography space, the third space is a Helmert space, and the virtual geoid is a Helmert cogeoid.

In a further embodiment, the stored processor-executable software instructions may be configured to cause a processor to perform operations that further include generating a geoid model based on the gravity field data and an digital elevation model. In a further embodiment, the stored processor-executable software instructions may be configured to cause a processor to perform operations such that generating the orthometric height information based on a combination of the airborne LiDAR data and the generated position information includes generating the orthometric height information based on a combination of the airborne LiDAR data, the generated position information, and the generated geoid model.

Further embodiments may include a computing device having a processor that may be configured with processor-executable instructions to perform operations including receiving airborne navigation data, airborne gravity data, and airborne LiDAR data, generating position information based on the navigation data, generating gravity field information based on a combination of the airborne gravity data and the generated position information, generating orthometric height information based on a combination of the airborne LiDAR data and the generated position information, and generating a geoid based on a combination of the generated orthometric height information and the generated gravity field information.

In an embodiment, the processor may be configured with processor-executable instructions to perform operations such that generating the geoid based on a combination of the generated orthometric height information and the generated gravity field information includes performing a three-space method that includes subtracting topographical effects on a gravity anomaly, converting the gravity anomaly from a first space to a no-topography space, performing downward continuation operations on the gravity anomaly in the no-topography space, converting the downward continued gravity anomaly from the no-topography space to a Helmert space, performing integration operations on the gravity anomaly in the Helmert space to determine a Helmert cogeoid, and converting the Helmert cogeoid to the geoid.

Further embodiments may include methods of determining a geoid that include receiving in a processor of a computing device airborne navigation data, airborne gravity data, and airborne LiDAR data, generating position information based on the navigation data, generating gravity field information based on a combination of the airborne gravity data and the generated position information, generating orthometric height information based on a combination of the airborne LiDAR data and the generated position information, and generating the geoid based on a combination of the generated orthometric height information and the generated gravity field information.

In an embodiment, the method may include generating updated orthometric height information based on a combination of the LiDAR data, the generated position information, and the generated geoid. In a further embodiment, the operations of generating updated orthometric height information and generating the geoid based on a combination of the generated orthometric height information and the generated gravity field information may be performed repeatedly.

In a further embodiment, the method may include generating a digital elevation model based on the generated orthometric height information. In a further embodiment, generating the digital elevation model may include generating the digital elevation model based on a combination of the generated geoid and the generated orthometric height information. In a further embodiment, generating the geoid based on a combination of the generated orthometric height information and the generated gravity field information may include performing a three-space method.

In a further embodiment, performing a three-space method may include subtracting topographical effects on a gravity anomaly, converting the gravity anomaly from a first space to a second space, performing downward continuation operations on the gravity anomaly in the second space, converting the downward continued gravity anomaly from the second space to a third space, performing integration operations on the gravity anomaly in the third space to determine a virtual geoid, and converting the virtual geoid to the geoid. In a further embodiment, the second space is a no-topography space, the third space is a Helmert space, and the virtual geoid is a Helmert cogeoid.

In a further embodiment, the method may include generating a geoid model based on the gravity field data and an digital elevation model, in which generating the orthometric height information based on a combination of the airborne LiDAR data and the generated position information includes generating the orthometric height information based on a combination of the airborne LiDAR data, the generated position information, and the generated geoid model.

Further embodiments may include a computing device that includes a processor configured with processor-executable instructions to perform various operations corresponding to the methods discussed above. Further embodiments may include a computing device having various means (e.g., processor, memory, receiver circuitry, etc.) for performing functions corresponding to the method operations discussed above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1A:
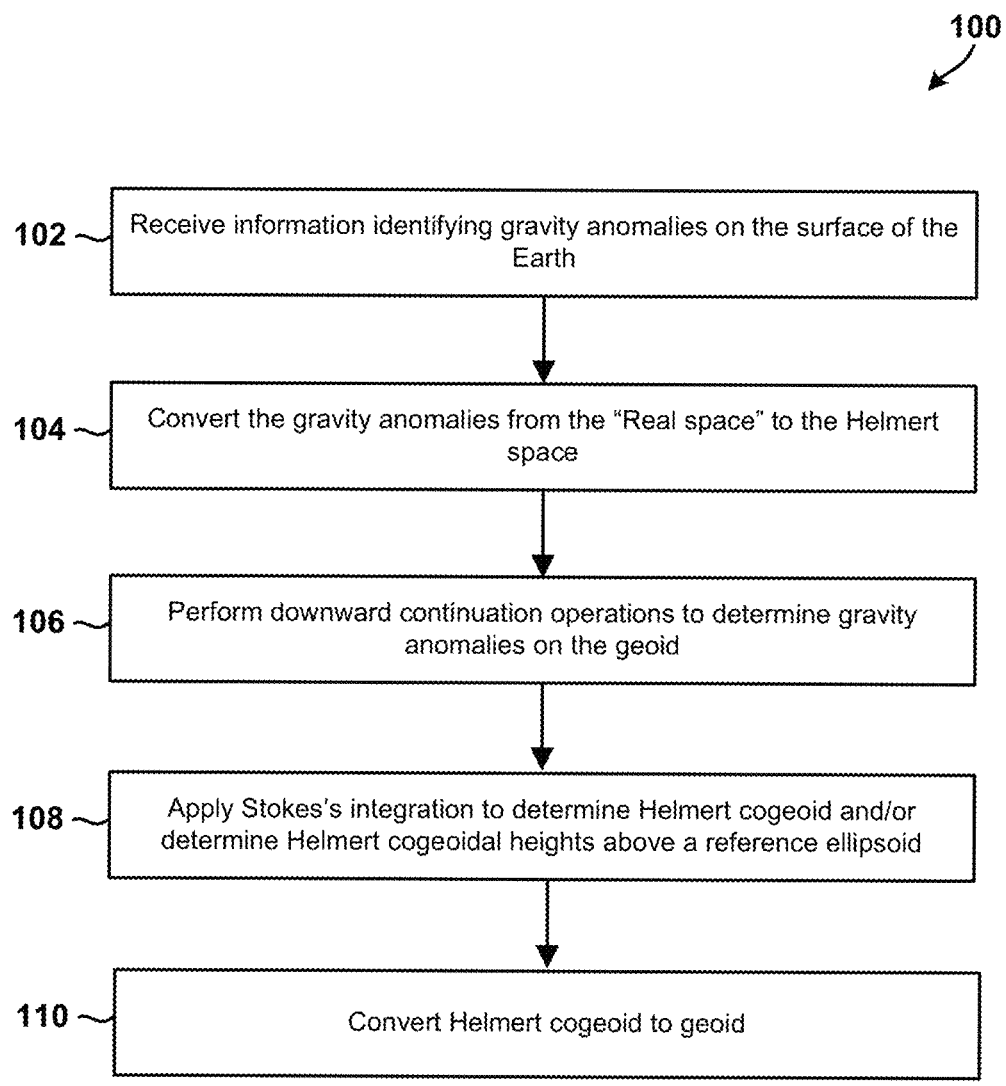
FIG. 1A is a process flow diagram illustrating an example two-space method for computing a geoid.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices configured with processor-executable instructions to perform the methods, of using a combination of airborne navigation data, airborne gravity data, and airborne LiDAR data to generate a more accurate geoid and better digital elevation models (DEMs). A computing device may be configured to generate, collect, or receive airborne data that includes navigation data, gravity data, and LiDAR data. The computing device may use the navigation data to generate position information, use the gravity data in conjunction with the generated position information and an initial gravity model including geoid to generate gravity field information, use the LiDAR data in conjunction with generated position information to generate orthometric height information and to generate a DEM, and use the generated gravity field information in conjunction with the DEM to generate a more accurate geoid. The computing device may then use this more accurate geoid to improve upon the accuracy of the orthometric height information and/or to generate a more detailed DEM and improved gravity data (field), which may then be used to further improve the accuracy of the geoid. This creates a feedback loop in which the DEM and gravity data are used to improve the accuracy of the geoid, and the geoid is used to improve the accuracy of the DEM and gravity data until the process coverages.

By generating an improved and more accurate geoid and better digital elevation models (DEMs), the various embodiments improve the performance and functioning of computing devices that implement solutions that rely on height information, such as computing devices that implement all or portions of a flood/storm surge modeling system, a drainage/water flow system, a vertical deformation monitoring system, etc. Other improvement to the functions and functionalities of such computing device will be evident from the disclosures below.

The word "exemplary" is used herein to mean "serving as an example, instance, or illustration." Any implementation described herein as "exemplary" is not necessarily to be construed as preferred or advantageous over other implementations.

The terms "computing device" and "computing system" are used generically and interchangeably herein, and may refer to any one or all of server computing devices, personal computers, lap-top computers, tablet computers, netbooks, ultrabooks, palm-top computers, personal data assistants (PDA's), cellular telephones, Global Positioning System (GPS) receivers, wireless gaming controllers, and other similar electronic devices that include a memory and a programmable processor. While the various embodiments may be implemented and used in any computing system that includes a programmable processor, they are particularly useful in systems that rely on or use spatial, distance, elevation, location, or height information.

Generally, heights are measured relative to some reference surface on which all the heights are zero. For example, global navigation satellite systems (GNSS), such as the Global Positioning System (GPS), the Russian GLONASS system, the European GALILEO system, and the Chinese BEIDOU system provide heights above (or below) an ellipsoidal surface that approximates the shape of the Earth. This ellipsoid is called a "reference ellipsoid" and has a shape similar to that of a flattened basketball, which serves as the reference surface on which all the heights are zero. Heights computed relative to this reference ellipsoid may be called "geodetic heights" or "ellipsoidal heights".

Geodetic heights typically do not convey meaningful information unless they are evaluated in conjunction with other information. Further, some parts of the Earth may be tens of meters below the above-mentioned reference ellipsoid. As a result, geodetic/ellipsoidal heights (e.g., elevations computed relative to the above-described reference ellipsoid, etc.) may incorrectly identify a valley as a hill, or cause other problems in systems and solutions that use height information. For example, a system that uses ellipsoidal heights to model water flow may incorrectly display water as flowing uphill.

A more meaningful measure of elevation is the height above mean sea level. However, since the actual mean sea surface is not level (e.g., due to the influences of wind, currents and other forces, etc.), it is not suitable for use as an altitude, vertical, or height datum. As a result, many systems use a gravitational equipotential surface on which no water flows as the altitude, vertical, or height datum (or as the reference surface on which all the heights are zero). The theoretical model of the earth's gravity field that is closest to the mean sea level is known as the "geoid." The geoid describes the irregular shape of the Earth, and identifies the shape that the surface of the oceans would take under the influence of Earth's gravitation and rotation alone (i.e., in the absence of other influences such as winds, currents, tides, etc.).

The geoid may be used as a zero surface for measuring heights, altitudes and elevations, and is the traditional datum used for measuring heights "above mean sea level." The use of the geoid (e.g., to determine heights, altitude, etc.) helps ensure consistency with surveying measurements, because instruments used for measuring heights are also aligned to a level surface of the Earth's gravity field.

Traditionally, geoids have been calculated by government mapping agencies or academic groups over whole countries. This government involvement is indicative of the importance of the geoid. Indeed, the geoid is normally viewed as part of a complete national spatial infrastructure. In addition to national geoid computations, local geoids are becoming more and more desirable for engineering applications. As such, improved solutions for generating better and more accurate local and national geoids will be beneficial to a wide variety of entities.

Due to variations in the earth's density, the geoid may undulate by up to 100 meters from the smooth reference ellipsoid. The difference or separation between the geoid and the reference ellipsoid is called the "geoid undulation." With a determined geoid undulation of a point, its orthometric height (e.g., height relative to the geoid) may be calculated by subtracting the geoid-ellipsoid separation from the geodetic height of the point measured by global navigation satellite systems (GNSS). However, using conventional solutions, computations of the geoid are approximate, and can be very faulty in some areas because of constant surface and subterranean movement, unknown density variations below the surface of topography, and poor gravity data coverage or quality. In addition, conventional solutions rely primarily on gravity observations to determine the geoid. These gravity observations are usually collected via ground gravity surveys conducted by government agencies, and this has lead to a grouping of gravity observations along established roads or paths. As a result, on a national level, there is a need to efficiently collect data to fill in large gaps resulting from this distribution. For local geoid determination, detailed gravity data with good coverage over focus areas would help meet higher geoid accuracy requirements. In both cases, the use of airborne gravimetry data, techniques and solutions would improve upon conventional solutions.

A digital elevation model (DEM) is a collection of orthometric heights of topography over an area. Historically DEMs were produced using standard ground survey leveling techniques using a local mean sea level as the reference surface. As the word "leveling" implies, this method of surveying naturally followed a surface of constant gravity (e.g., a geoid, etc.). However, existing ground survey leveling techniques are only cost effective for very small surveys. As a result, many systems that generate or use large area DEMs use remote sensed radar and imagery data from satellite based sensors. However, the resolution available via these methods does not approach that of traditional leveling techniques. As such, airborne data may be required when high resolution DEMs are required over a relatively large area. This may include stereo photogrammetry, but the effectiveness of such solutions is limited. For example, existing photogrammetry are not adequate for modeling highly vegetated areas.

Airborne LiDAR (Light Detection and Ranging) has proven to be an effective method for generating digital elevation models (DEMS) in most terrain environments. This is a direct georeferencing system in which the mapped points on the topographical surface are computed relative to the ellipsoid through the use of GNSS and inertial systems that measure the position and the orientation of the scanner during data capture. The actual coordinate of each point may be computed by combining the sensor position and orientation with the range and angle to the point observed by the sensor. The collection of these points (once filtered to remove vegetation and manmade items) may form a terrain model. These ellipsoidal elevations may be converted to orthometric heights as by applying a geoid model to produce a digital elevation model (DEM). However, geoids and geoid models generated via conventional solutions are not sufficiently consistent or accurate, and often limit the accuracy of the DEM.

Traditional airborne gravimetry presents several issues, some of which may be overcome by the various embodiments. For instance, the resolutions of airborne gravity are limited by a minimum flight altitude for safety and the application of a low pass filter to filter out noises caused by instrument platform vibrations etc. Some high frequency gravity signal from the topographic effect may be filtered out too. Through the various embodiments, some the lost signals may be recovered.

The Stokes-Helmert method may be used to compute the geoid. However, the traditional Stokes-Helmert method of geoid computation, which converts data between two computational spaces, does not preserve the detailed gravity field in all cases.

Figure 1B:
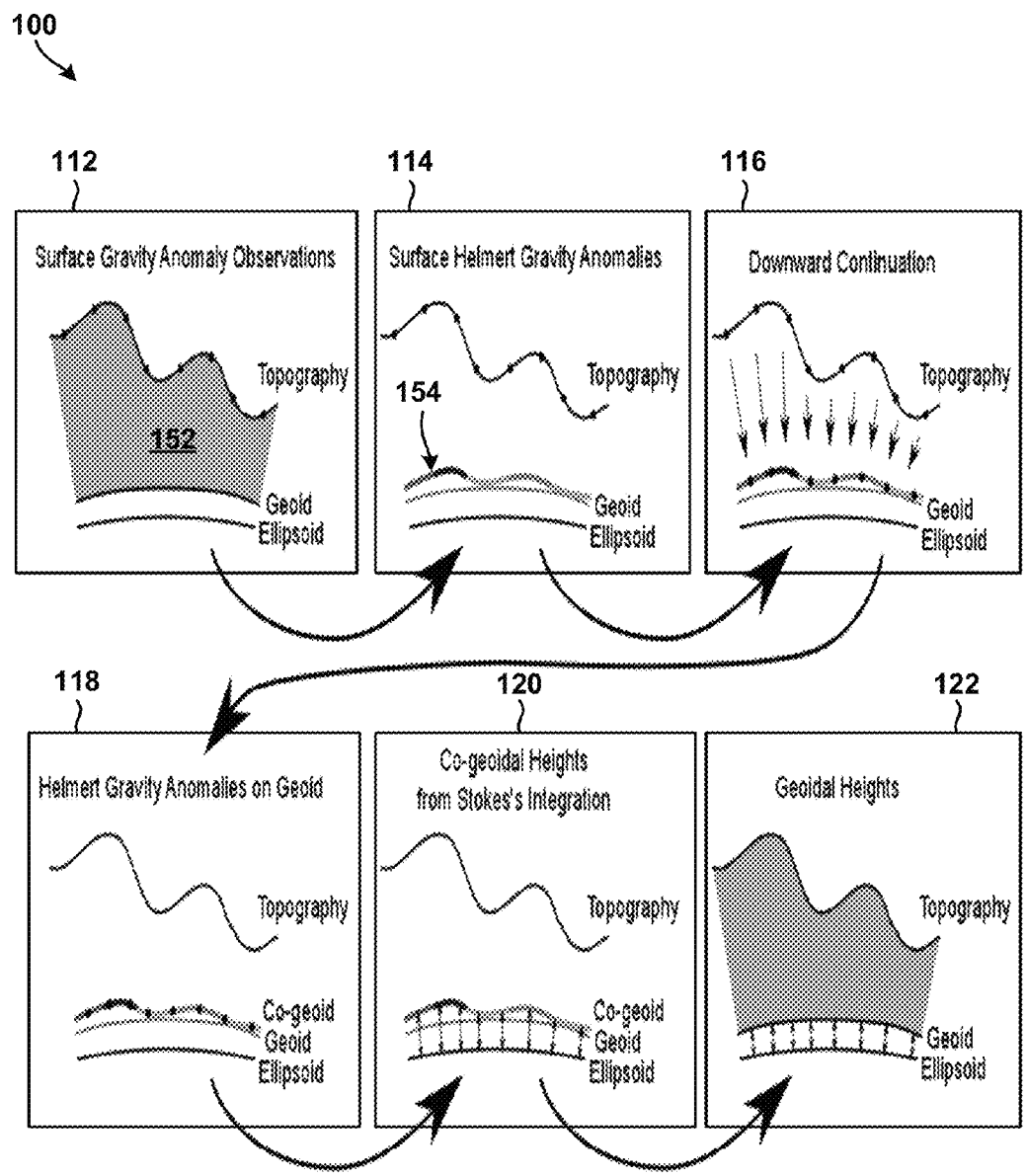
FIG. 1B is a flow diagram illustrating changes in information when computing the geoid via an example two-space method.

FIGS. 1A and 1B illustrate an example two-space method 100 of using the Stokes-Helmert technique to compute the geoid. With reference to FIG. 1A, in block 102, a computing device may receive information identifying "gravity anomalies" on the surface of the Earth. Gravity anomalies are gravity observations for which a reference gravity value has been subtracted. In block 104, the computing device may convert the gravity anomalies from the "Real space" to the Helmert space. The Real space corresponds to the real world in which gravity values are observed. The Helmert space is a virtual space used to compute the geoid. The representation of a geoid in the Helmert space is called a Helmert cogeoid.

As part of the operations of block 104, the computing device may subtract topographical effects on the gravity anomalies (i.e., subtract the influence of the masses between the gravity observations and the geoid in the Real space), add condensed topographical effects on the gravity anomaly so as to account for the influence of the compressed masses, and convert the gravity anomalies at the observation points from the Real space to the Helmert space. In block 106 the computing device may perform "downward continuation" operations to determine gravity anomalies on the geoid. Downward continuation is a technique for determining gravity anomalies on a geoid based on gravity anomalies at a topographical surface. In block 108, the computing device may use the well-known "Strokes integration" technique to generate a Helmert cogeoid and/or determine cogeoidal heights (heights between a reference ellipsoid and the Helmert cogeoid). In block 110, the computing device may convert the Helmert cogeoid to a geoid.

FIG. 1B is an illustrative representation of the method 100 described above. For example, block 112 illustrates that in the Real space there are masses 152 between the gravity observations and the geoid. Due to the presence of these masses 152, it is often challenging to determine or model the behavior of gravity (e.g., based on the received gravity anomalies, etc.). To overcome this, the computing device may convert the information from the Real space to the Helmert space, determine or model the behavior of gravity in the Helmert space, use this information to generate a representation of the geoid in the Helmert space (i.e., a Helmert cogeoid), and then convert the representation of the geoid in the Helmert space to a geoid in the Real space.

Block 114 illustrates that, in the Helmert space, the masses 152 may be compressed into a thin layer 154 on the geoid. The gravity anomalies may be converted from the Real space to the Helmert space by subtracting the influence of the masses 152, and adding the influence of the compressed masses represented by the thin layer 154. The thin layer 152 of compressed masses is sometimes referred to as a "condensation layer."

Blocks 116 and 118 illustrate that, after the gravity anomalies are converted to the Helmert space, they may be brought down to the geoid. The process of determining gravity anomalies on the geoid based on gravity anomalies at the topographical surface is called "downward continuation."

If the values on the geoid are known, the values of gravity above the geoid may be calculated accurately via a well-established relationship called the "Poisson integral." However, in this case, the opposite operation is required, and the Poisson integral relationship must be inverted. Yet, inverting the Poisson integral relationship to accomplish such a computation is a challenging design task, and may require that the computing device execute computationally-intensive processes that slow or render the device non-responsive for a period of time.

Gravity anomalies at the geoid may be used to calculate the height of the geoid above the reference ellipsoid via an operation/technique known as "Stokes's integration." The difference in arrangement of masses in the Helmert space vs. the Real space means that the geoid in the Helmert space (i.e., the Helmert cogeoid) will be in a slightly different position from the geoid in the Real space.

Block 120 illustrates that Stokes's integration may be applied to calculate the Helmert cogeoid and/or to determine cogeoidal heights above the reference ellipsoid. This may be accomplished by subtracting the influence on the geoid of the compressed masses and adding back the influence of the real masses to generate the output illustrated in block 122.

Due to the use of two spaces (i.e., the Real space and the Helmert space), the implementation of the Stokes-Helmert technique described above with reference to FIGS. 1A and 1B is referred to as a "two-space" approach. While there are some benefits to using the two-space approach, solutions that implement the two-space approach may not consistently generate a sufficiently detailed or accurate geoid. To overcome these limitations of existing solutions, the various embodiments include computing devices configured to generate the geoid and/or digital elevation models (DEMs) by implementing or using a "three-space" approach. The three-space approach improves the accuracy of the downward continuation operations by providing smooth input values, and may be used to generate an improved and more detailed geoid or DEM.

Figure 2:
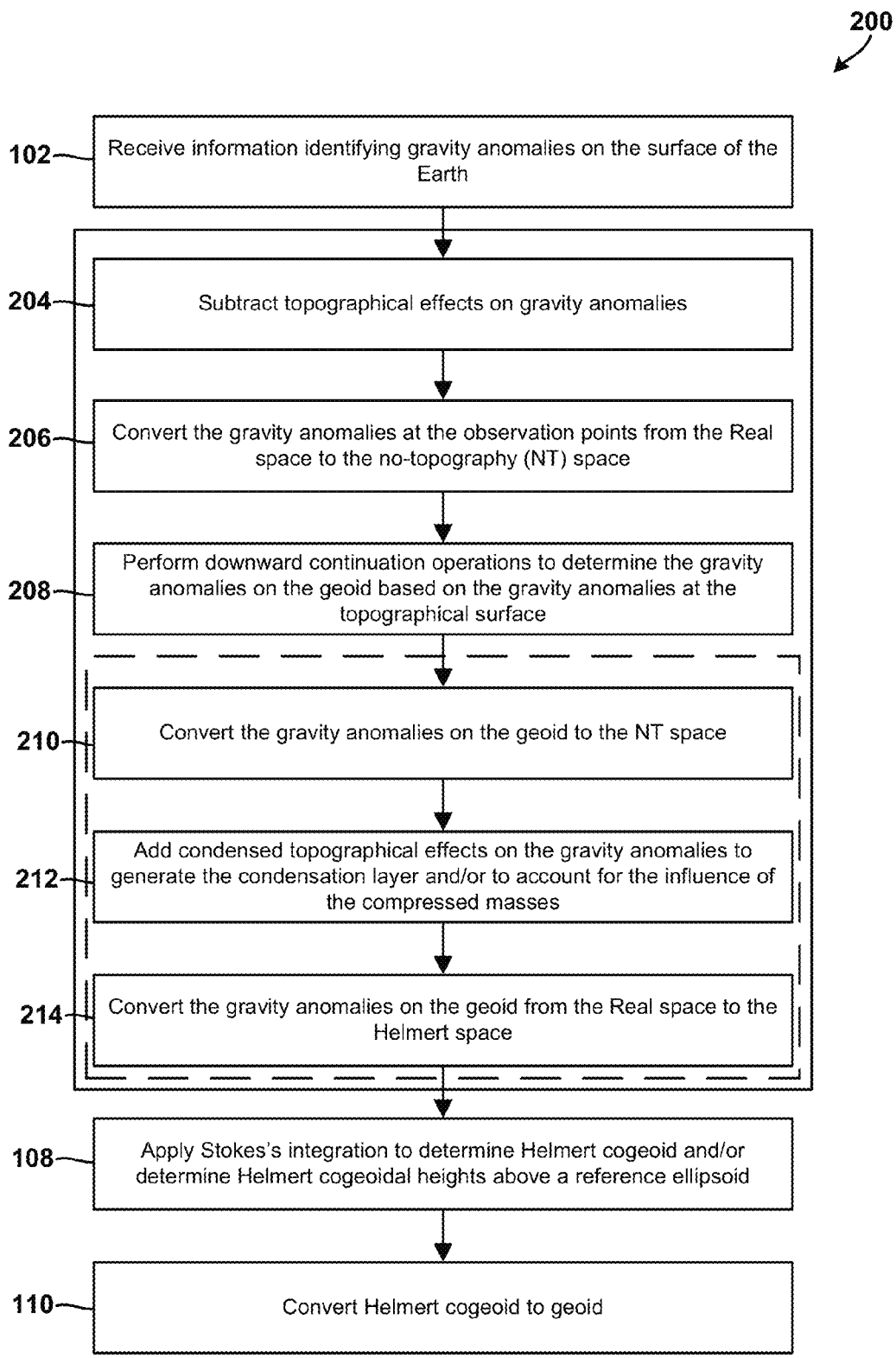
FIG. 2 is a process flow diagram illustrating an embodiment three-space method for computing a geoid.

FIG. 2 illustrates a three-space method 200 for using the Stokes-Helmert technique to compute a geoid in accordance with an embodiment. In block 102, a computing device may receive information identifying gravity anomalies on the surface of the Earth. In block 204, the computing device may subtract topographical effects on the gravity anomaly. That is, in block 204, the computing device may subtract the influence of the masses between the gravity observations and the geoid in the Real space. In block 206, the computing device may convert the gravity anomalies at the observation points from the Real space to the no-topography (NT) space. Unlike the Helmert space, where all the masses between gravity observations and the geoid are compressed onto the geoid, in the NT space those masses are entirely absent. The roughest part of the gravity field is produced by topographical masses close to the observation points, and the transformation to the NT space involves removing the influence of these masses. As a result, the gravity field is far smoother in the NT space.

In block 208, the computing device may perform downward continuation operations to determine the gravity anomalies on the geoid based on the gravity anomalies at the topographical surface. The smooth anomalies in the NT space are downward continued in the same way as the Helmert anomalies, but because the input is smoother, the result is more accurate (less noisy).

In blocks 210-214, the computing device may convert the gravity anomalies on the geoid in the no-topography (NT) space into the Helmert space. This transformation may include adding the influence of the compressed topographical masses to the gravity anomalies, the result of which is gravity anomalies on the geoid in the Helmert space. In the example illustrated in FIG. 2, the computing device adds condensed topographical effects on the gravity anomalies (i.e., to account for the influence of the compressed masses and/or to generate the condensation layer) in block 212, and converts the gravity anomalies on the geoid from the Real space to the Helmert space in block 214. In block 108, the computing device may apply the "Strokes integration" technique to generate a Helmert cogeoid and/or determine cogeoidal heights. In block 110, the computing device may convert the Helmert cogeoid to a geoid.

Figure 3:
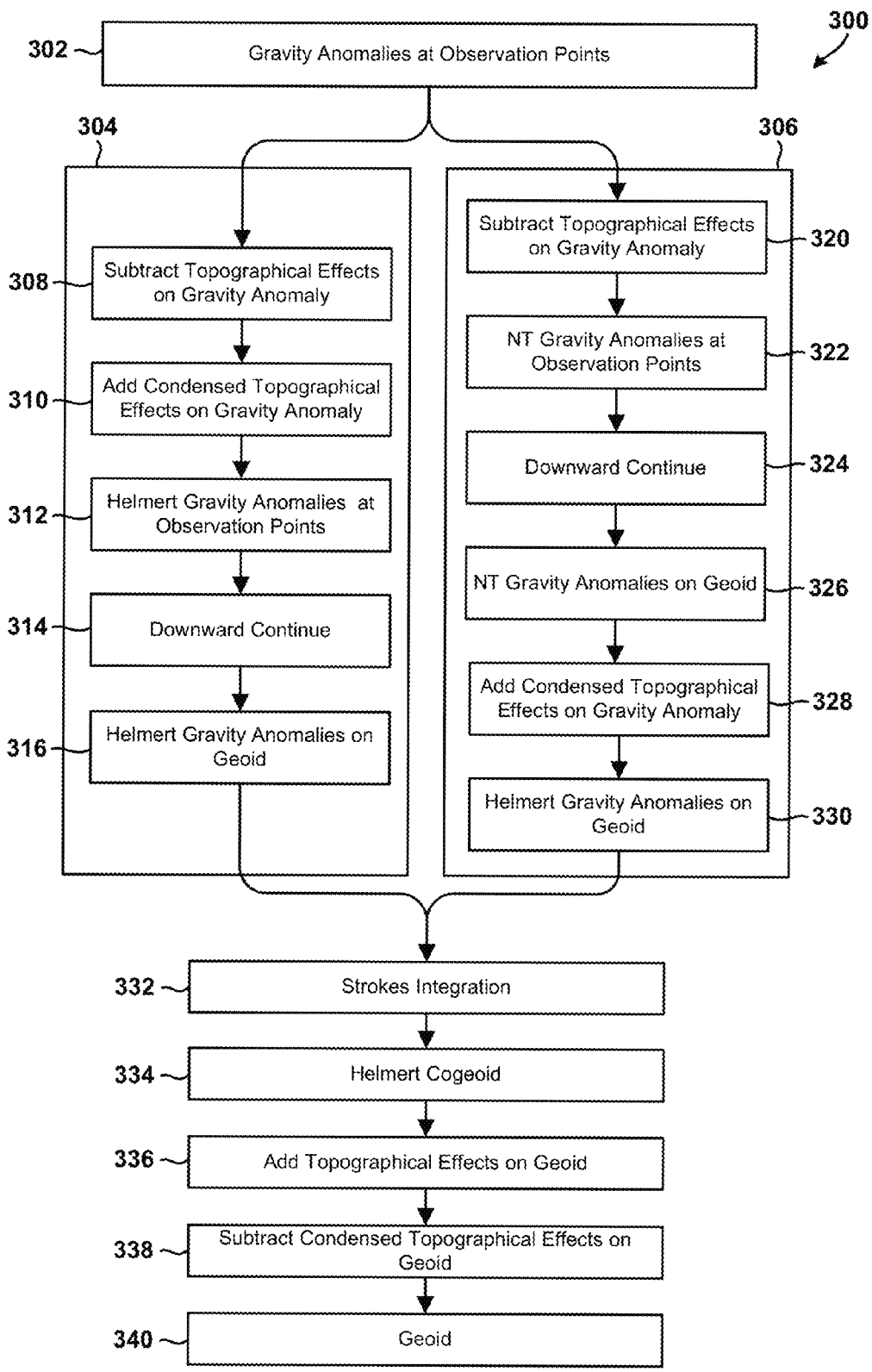
FIG. 3 is a process flow diagram illustrating a method of computing a geoid using one of a two-space technique and three-space technique in accordance with an embodiment.

FIG. 3 illustrates a method 300 of using one of a two-space and three-space approach to compute a geoid in accordance with an embodiment. In block 302, a computing device may receive or generate data that identifies gravity anomalies at observation points (e.g., surface gravity anomaly observations, etc.). In response to receiving or generating this information, the computing device may perform the operations in one of blocks 304 and 306. Specifically, the computing device may perform the operations of the block 304 to implement a two-space approach or perform the operations of the block 306 to implement a three-space approach.

When using the two-space approach, the computing device may subtract topographical effects on the gravity anomaly in block 308 (i.e., the computing device may subtract the influence of the masses between the gravity observations and the geoid in the Real space). In block 310, the computing device may add condensed topographical effects on the gravity anomaly so as to account for the influence of the compressed masses and/or so as to generate the condensation layer. In block 312, the computing device may convert the gravity anomalies at the observation points from the Real space to the Helmert space (i.e., the computing device may "Helmertize" the gravity anomalies at observation points). In block 314, the computing device may perform downward continuation operations to determine the gravity anomalies on the geoid based on the gravity anomalies at the topographical surface. In block 316, the computing device may convert the gravity anomalies on the geoid from the Real space to the Helmert space.

When using the three-space approach, the computing device may subtract topographical effects on the gravity anomaly in block 320. In block 322, the computing device may convert the gravity anomalies at the observation points from the Real space to the no-topography (NT) space. In block 324, the computing device may perform downward continuation operations to determine the gravity anomalies on the geoid based on the gravity anomalies at the topographical surface. In blocks 326, the computing device may convert the gravity anomalies on the geoid to the no-topography (NT) space. In block 328, the computing device may add condensed topographical effects on the gravity anomalies so as to account for the influence of the compressed masses and/or so as to generate the condensation layer. In block 330, the computing device may convert the gravity anomalies on the geoid from the Real space to the Helmert space.

In block 332, the computing device may apply Stokes's integration to calculate or generate a Helmert cogeoid in block 334. In block 336, the computing device may add topographical effects on the geoid. In block 338, the computing device may subtract condensed topographical effects on geoid. In block 340, the computing device may generate or update the geoid.

In some cases, the three-space approach described above may fail to accurately model the transformations of gravity anomalies and geoid between the no-topography (NT) space and the Real space. In addition, the three-space approach described above has conventionally taken as input a regularly spaced grid of gravity anomalies, located on the surface of the topography. Yet, airborne gravity observations are made at various flight heights, not on the surface of the topography. As a result, airborne gravity observations are not easily convertible into a grid. For these reasons, the two and three step approaches described above with reference to FIGS. 1A, 1B, 2 and 3 may not be adequate for generating an accurate geoid or a sufficiently detailed digital elevation model (DEM).

To overcome these limitations, the computing device may be configured to use aircraft-acquired gravity data and terrestrial gravity data to compute the geoid. In an embodiment, a computing device may be configured to use a "three-space approach" that retains roughness when downward continuing aircraft-acquired gravity data. In another embodiment, the computing device may be configured to use a least squares downward continuation method that smoothly combines airborne and terrestrial gravity observations/data in a single step so as to produce a more accurate and higher-resolution geoid.

In an embodiment, the computing device may be configured to add airborne gravity measurements to the collection of airborne LiDAR data, use the LiDAR data to produce a digital elevation model, and use this elevation model in conjunction with the gravity data to produce an improved geoid. The computing device may use this geoid to produce an improved DEM based on improved orthometric heights and improve the gravity data processing for better accuracy of the gravity anomaly. Thus, the computing device may use the geoid to generate an improved and/or more detailed DEM as well as more accurate gravity anomalies, and then use the DEM and gravity anomalies to further improve upon geoid. The computing device may perform these operations repeatedly until it obtains the desired level or accuracy or detail.

In an embodiment, the computing device may be configured to add airborne gravity measurements to the collection of airborne stereo imagery, use the airborne stereo imagery to produce an elevation model, and use the elevation model in conjunction with gravity data to produce an improved geoid. The computing device may also use this geoid to produce an improved DEM based on improved orthometric heights.

Rather than taking as input a grid of gravity anomalies on the topographical surface and outputting a grid of gravity anomalies on the geoid, in an embodiment, the computing device may be configured to use a least-squares methodology to map gravity anomalies in a grid on the geoid. Using this approach, the computing device may generate input points on or above the topographical surface so that both airborne and terrestrial gravity anomalies may be combined to determine the geoid. The computing device may generate (as output) the grid of gravity anomalies on the geoid that best match the scattered input observations.

In an embodiment, the computing device may be configured to perform operations to implement a Poisson upward continuation method. A Poisson upward continuation may be defined by the equation:

$$\Delta g^{Helmert}(P) = \int\int_\Omega K(P, P_0) \Delta g^{Helmert}(P_0) d\Omega \to \text{solve for } \Delta g^{Helmert}(P_0),$$

where the equation must be solved to find the values of $\Delta g\text{Helmert}(P0)$. This may be solved by representing the integration using a matrix, K, $\Delta g\text{Helmert}(P0)$ by a vector, g, and $\Delta g\text{Helmert}(P0)$ by a vector, g0. The conventional solution is:

$$g_0 = K^{-1} g$$

whereas in the method(s) embodied herein (e.g., performed by the computing device), this is solved using a least squares approach according to:

$$g_0 = (K^T K)^{-1} K^T g$$

or by a more general least squares solution which may include weighting, constraints, or other mathematical methods used to solve inverse problems in a least squares sense. The conversion of measured gravity to Helmert space follows the equation:

$$\Delta g^{Helmert} = \Delta g^{Free-Air} + \underbrace{(\varepsilon_g^{Condensed} - \varepsilon_g^{Real})}_{\substack{\text{Direct}\\\text{Topographical}\\\text{Effect }(DTE)}} - \underbrace{(\varepsilon_\gamma^{Condensed} - \varepsilon_\gamma^{Real})}_{\substack{\text{Secondary}\\\text{Indirect}\\\text{Topographical}\\\text{Effect }(SITE)}}$$

In order to accommodate airborne-acquired gravity data, a computing device implementing an embodiment three space method may convert the data into the no topography space (NT), perform downward continuation, and then convert the data to the Helmert space. As with the anomalies in the Helmert space, the NT space gravity anomalies may be harmonic between the geoid and the observation points, and may be downward continued to the geoid using the inverse Poisson integral approach. The Poisson downward continuation may be performed using the least squares method so as to transform the gravity anomalies at flying height, observed at scattered points, to a grid of gravity anomalies on the geoid. The aliasing effects (for which gridding is susceptible) may be minimized via the use of the smooth NT anomaly field.

The least squares downward continuation may produce excessively smooth results, especially when applied with airborne gravity data. This is both a result of the nature of the downward continuation solution and the filtering of airborne gravity observations to remove unwanted noise (e.g. from aircraft vibrations).

The no topography space (NT) gravity anomalies, when downward continued to the geoid, may be converted to the Helmert space by adding to them the effects of the topographical masses flattened ("condensed") onto the geoid. The resulting Helmert gravity anomalies are not significantly affected by variations in topographical density, and so are ideal for conversion to geoidal undulations via the Stokes' integration process. At this stage, a satellite-based reference field (converted into the Helmert space) with resolution of a specific long wavelength (e.g., about 220 km) may be subtracted from the Helmert gravity anomalies, creating residual Helmert gravity anomalies. Stokes's integration may be applied to the residual anomalies, severely down-weighting any components of the field below the given long wavelengths, and converting the residual Helmert gravity anomalies into the geoid in the Helmert space. This is called the "residual Helmet cogeoid."

The satellite-determined components of the Helmert cogeoid, up to the given long wavelengths, may be added to the residual Helmert cogeoid, creating the complete Helmert cogeoid. This may be converted back to the actual geoid by subtracting the effects on the geoid of condensed topography, and adding back the effects of the actual topography.

Figure 4A:
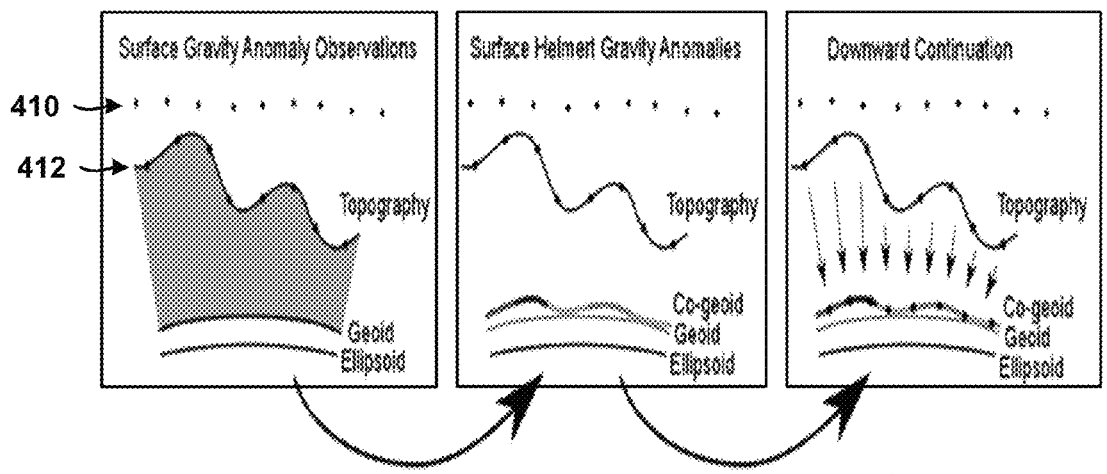
FIGS. 4A and 4B are flow diagrams illustrating that the geoid computations may include both airborne-acquired gravity observations and terrestrial gravity observations.
Figure 4B:
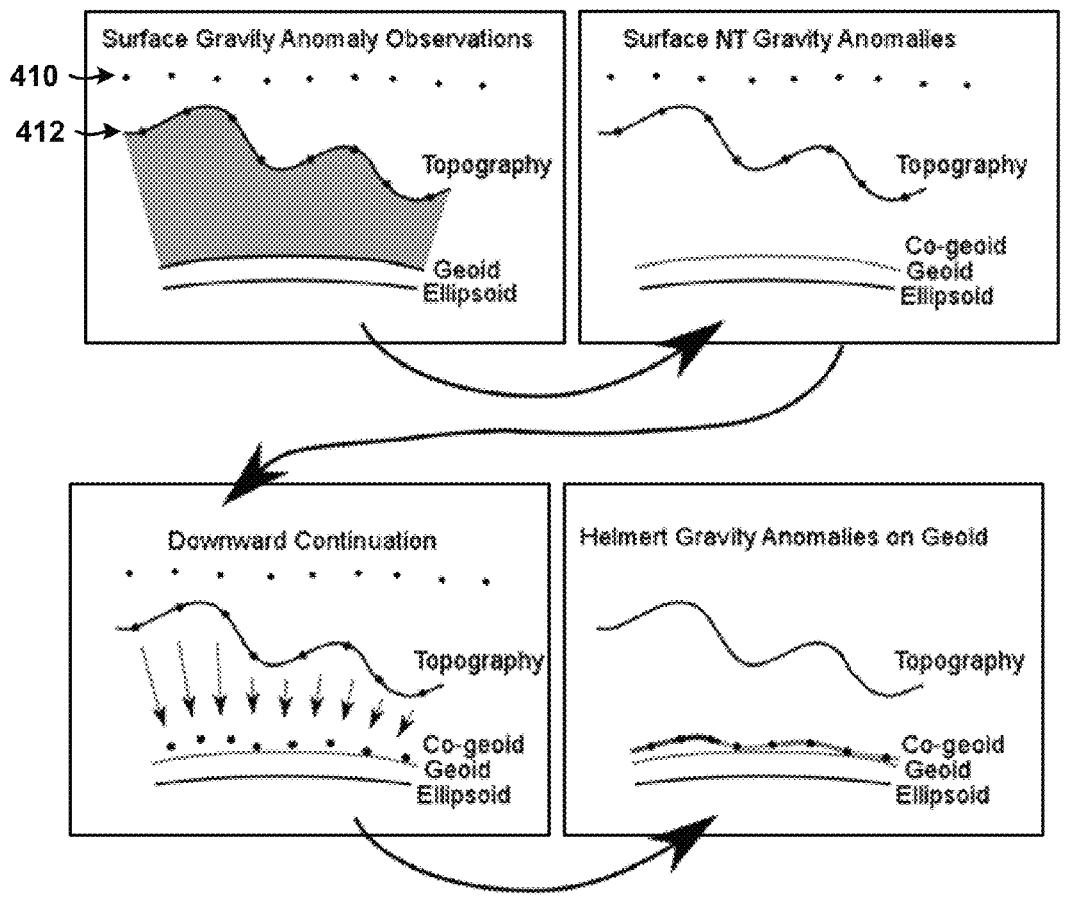

FIGS. 4A and 4B illustrate that the computing device may use aircraft-acquired gravity data 410 in conjunction with and terrestrial gravity data 412 to compute the geoid. As noted previously, the transformation into the NT space removes much of the roughness of the gravity field (since the roughness is mainly generated by topography). Thus, there is not much roughness to be lost during downward continuation. After downward continuation, with transformation from the NT space to the Helmert space, the roughness is restored.

Figure 5:
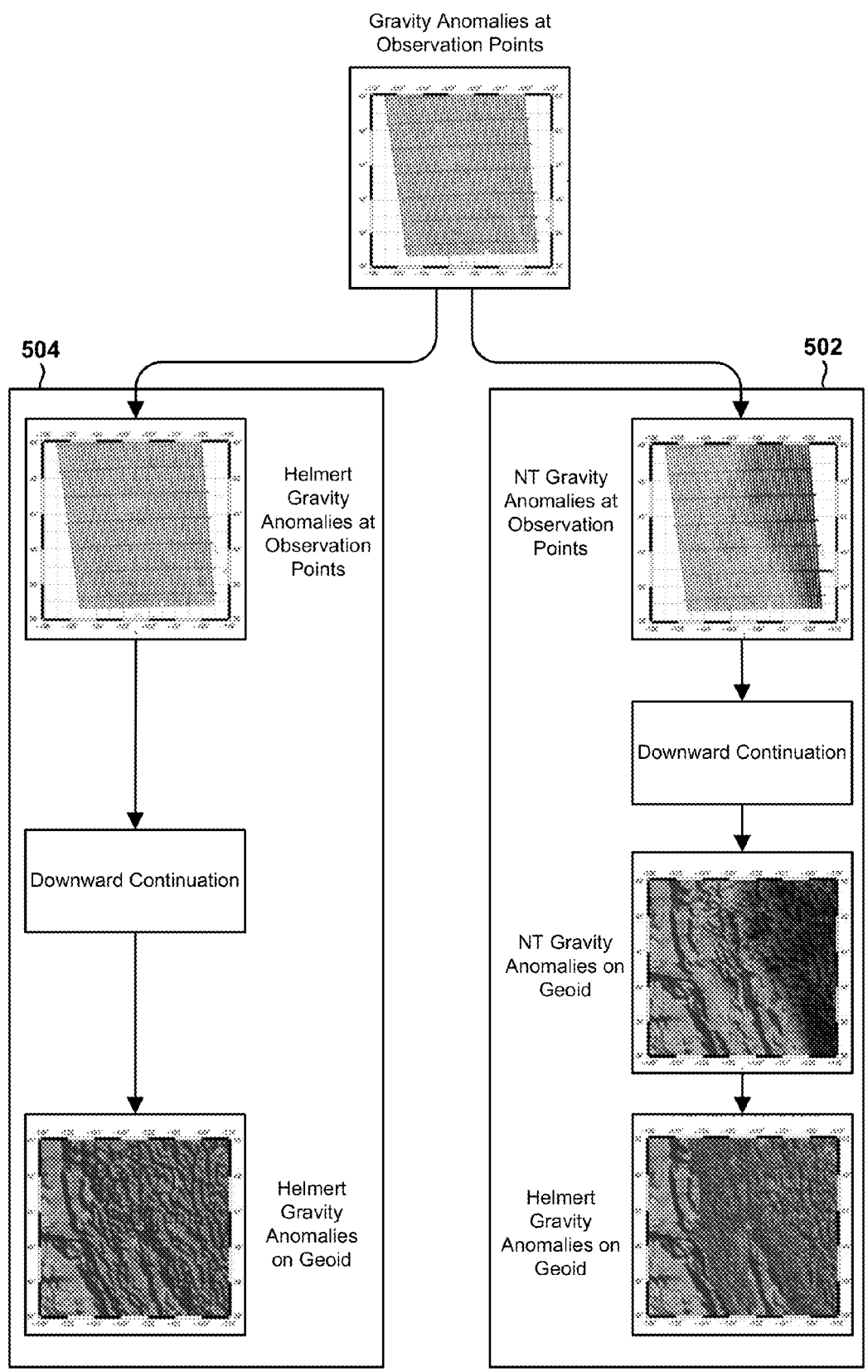
FIG. 5 is a block diagram illustrating the results for each stage of a geoid computation in both the two-space and three-space methods.

FIG. 5 is illustrates the roughness-retaining property of the three-space approach in this application, by showing side-by-side results for each stage of the computation for an airborne-gravity based test area in California. The downward continuation produces a relatively smooth grid of Helmert or NT gravity anomalies on the geoid. However, in the three-space approach 502, considerable roughness is restored when the NT anomalies resulting from downward continuation are converted to Helmert anomalies by adding the effects of condensed topography. In the two-space approach 504, roughness is not well preserved.

To test the above method, case studies were performed in three computation areas, testing the results using GPS on leveling points, and satellite-derived gravimetric geoids. One of these tests will be described below.

The GPS and leveling observations are valuable, because they provide an independent assessment of the geoid result accuracy. Since heights from leveling are orthometric heights (relative to the geoid), and heights from GPS are relative to the reference ellipsoid, the difference between these two height measurements at a given point provides the geoid-ellipsoid separation corresponding to that point. This can be compared with the calculated geoid-ellipsoid separation to estimate the geoid error at that point, and when this is done at an array of points it provides an assessment of geoid accuracy in the region where those points are located.

The orthometric heights coming from leveling are somewhat approximate, because leveling measurements are always made based on one or more tide gauges. The mean water level at these tide gauges is assumed to be equal to the geoid, but in fact may depart from it by several meters. As a consequence, leveled heights are often all too large or too small over a given area. Also, heights resulting from leveling must be converted to orthometric heights. This conversion may be inaccurate due to use to simplified and approximate formulas, or use of approximate gravity and DTM data in the conversions, but these errors are small outside of mountainous areas. Furthermore, systematic errors can accumulate in leveling networks, producing other errors in the height measurements from leveling. These errors tend of have consistent effects over smaller areas, so testing a geoid using GPS and leveling is still useful to test the variation of the geoid over short distances. However, the results will often show a constant or almost constant difference from the geoid results, that comes from leveling errors, and so GPS and leveling cannot use used to reliably test the geoid over long distances.

To test the long distance accuracy of the geoid, a different approach can be used. Modern satellite gravity models are very accurate over long distances, though they do not capture the variation of the geoid over short distances. Thus, they can be used to test the geoid accuracy in a domain where GPS and leveling observations cannot. This is done by comparing the average difference between a computed geoid and a satellite-derived geoid over a region. Averaging removes the influence of the short-distance geoid variations, so that its behavior over long distances alone is tested.

Figure 6:
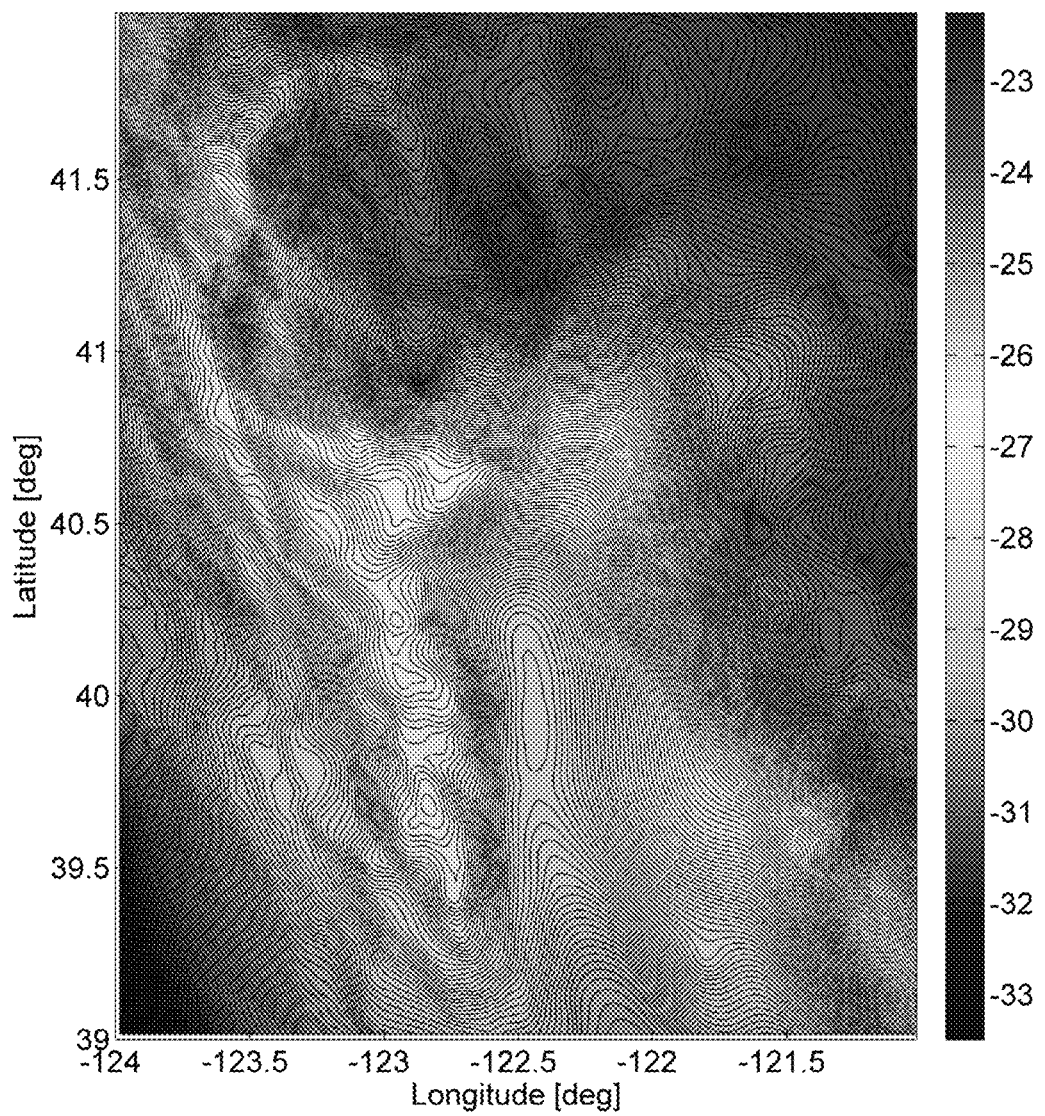
FIG. 6 is an illustration of an example map that could be generated by a computing device that implements one of the various embodiments.

FIG. 6 is an illustrating of an example topology map that could be generated by an embodiment computing device. An updated geoid (computed using airborne gravity data) is shown for a test area in California along with an older reference geoid (computed using satellite and terrestrial data) for the same area. The difference between these two geoid models represents the elevation error that would be incurred using the older reference geoid.

Figure 7:
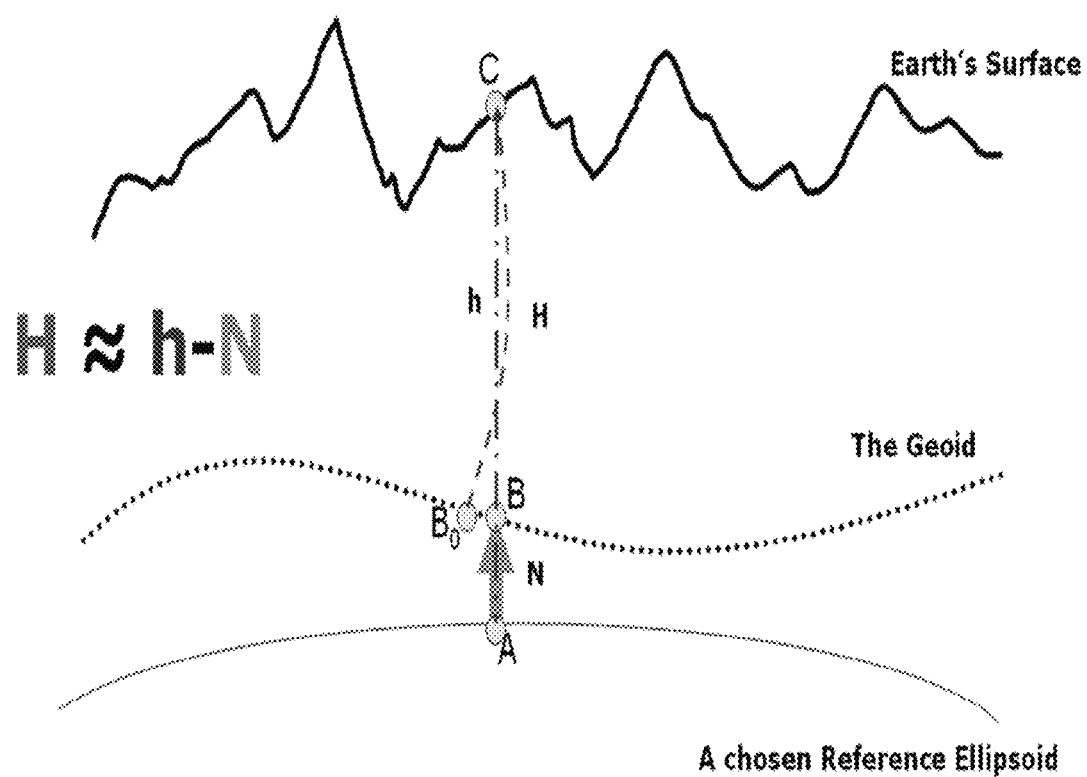
FIG. 7 is an illustration of the relationships between a reference ellipsoidal, geoid, and an orthometric height.

FIG. 7 illustrates the relationship between ellipsoidal and Orthometric heights. In the example illustrated in FIG. 7, the computing device determines a value for height "H," which is the height of a point on the surface of the earth above the geoid. The computing device may determine a value for height of a point "C" on the surface of the earth with reference to a chosen reference ellipsoid, and determine/record a value for height "h." The computing device then determine a value for distance N, which is the deference between the chosen reference ellipsoid and the geoid at a particular point. The computing device may then determine the (approximate) value of height H as the height above the ellipsoid "h" less distance N.

Figure 8:
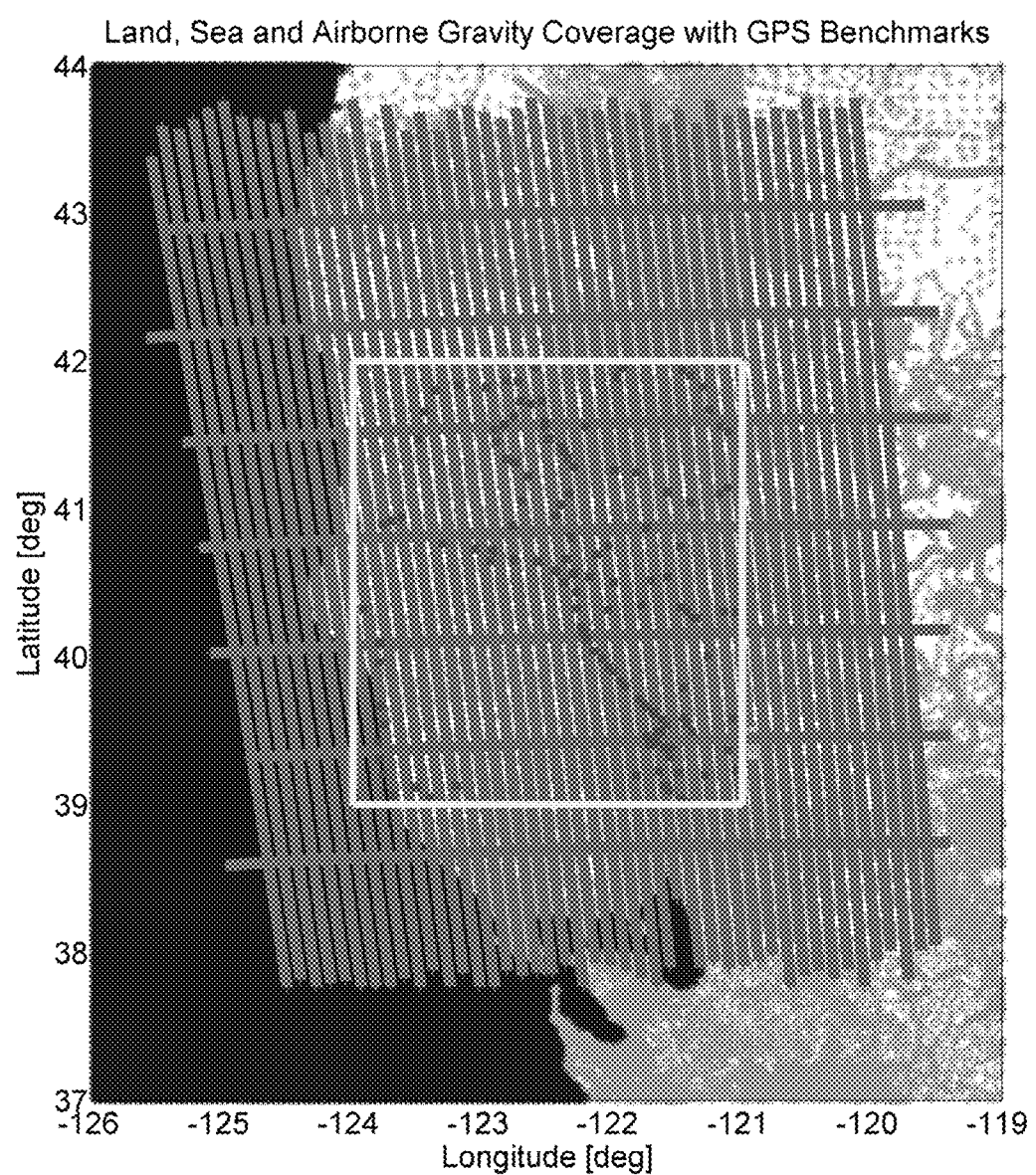
FIG. 8 is an illustration of a sample survey plan with for land, sea and airborne gravity coverage with GPS benchmarks.

The airborne gravity data may be collected in standalone flights or it may be collected as an added sensor with airborne LiDAR. FIG. 8 illustrates an embodiment of collecting and processing gravity and LiDAR to produce an improved digital elevation model (DEM) and geoid. The flight plan line spacing, altitude and survey speed are determined by the LiDAR survey requirements. Typical LiDAR surveys run relatively short lines (15-20 minutes) because of inertial heading drift. Gravity surveys by contrast require a minimum flight time of 10 minutes to minimize noise and discontinuities and can run very long lines for higher efficiency and lower cost. For the simultaneous collection of gravity and LiDAR it is desirable to run as long as is possible. The use of a high precision gravity sensor in the positioning solution significantly reduces heading drift providing the ability to run longer LiDAR lines and thus both the needs of the LiDAR survey and the gravity survey can be accommodated.

LiDAR surveys may be conducted day or night weather permitting. Gravity surveys are often only conducted during times of low turbulence which is often times is at night. This may present issues for combining imagery and gravity in some situations. It does not present a limitation for LiDAR. Further newer gravity sensors are more tolerant of turbulence and thus this is no longer a detriment to combined gravity and remote sensed surveys.

Figure 9:
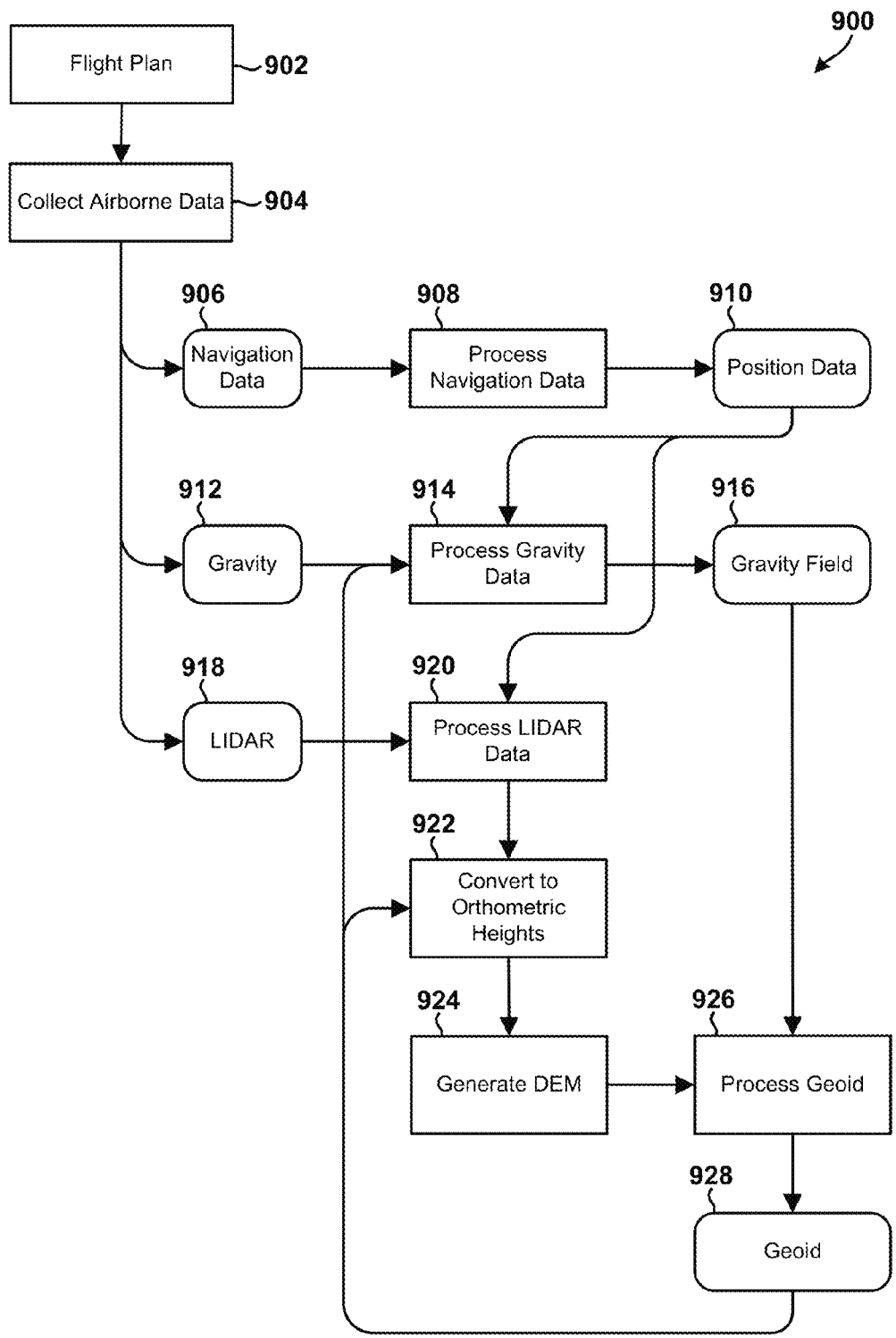
FIG. 9 is a process flow diagram illustrating an embodiment method of using airborne-acquired gravity observations to generate an improved geoid and an improved digital elevation model.

FIG. 9 illustrates a method 900 of using aircraft-acquired gravity data to compute the geoid in accordance with an embodiment. All or portions of method 900 may be performed by one or more processors in one or more computing devices.

In block 902, a computing device may develop or receive a flight plan based on the LiDAR or imagery collection requirements. In this flight plan, longer lines may be utilized to accommodate gravity collection. In block 904, the computing device may conduct a survey utilizing standard LiDAR and gravity calibration and control techniques, which may include using differential high accuracy GPS positioning. In block 908, the computing device may process/use the navigation data 906 that is collected during the aerial survey to determine aircraft position data 910. In block 914, the computing device may use gravity data 912 collected during the aerial survey and the generated position data 910 to compute a gravity field 916. In block 920, the computing device may use LiDAR data 918 collected during the aerial survey and the generated position data 910 to process the LiDAR data, which may including performing filtering operations to generate a bare earth model with heights based on a reference ellipsoid.

In blocks 922-928, the computing device may perform an iterative process that includes using the geoid separation to convert the ellipsoidal heights to orthometric elevations and/or to generate a digital elevation model (DEM), using the orthometric elevations and/or DEM to generate an improved geoid, and using the improved geoid to generate improved gravity data (field), to improve the orthometric elevations, and/or to generate more detailed DEMS. For example, in block 922, the computing device may convert the ellipsoidal heights to orthometric elevations. In block 924, the computing device may use the orthometric elevations to generate a DEM. The computing device may then use the DEM/orthometric elevations in conjunction with the gravity field 916 to compute the geoid 928 in block 926, and use the geoid to re-compute the orthometric elevations in block 922. Depending on the terrain and a priori terrain and geoid information available, a single iteration may produce an accurate and highly detailed DEM and geoid.

Figure 10:
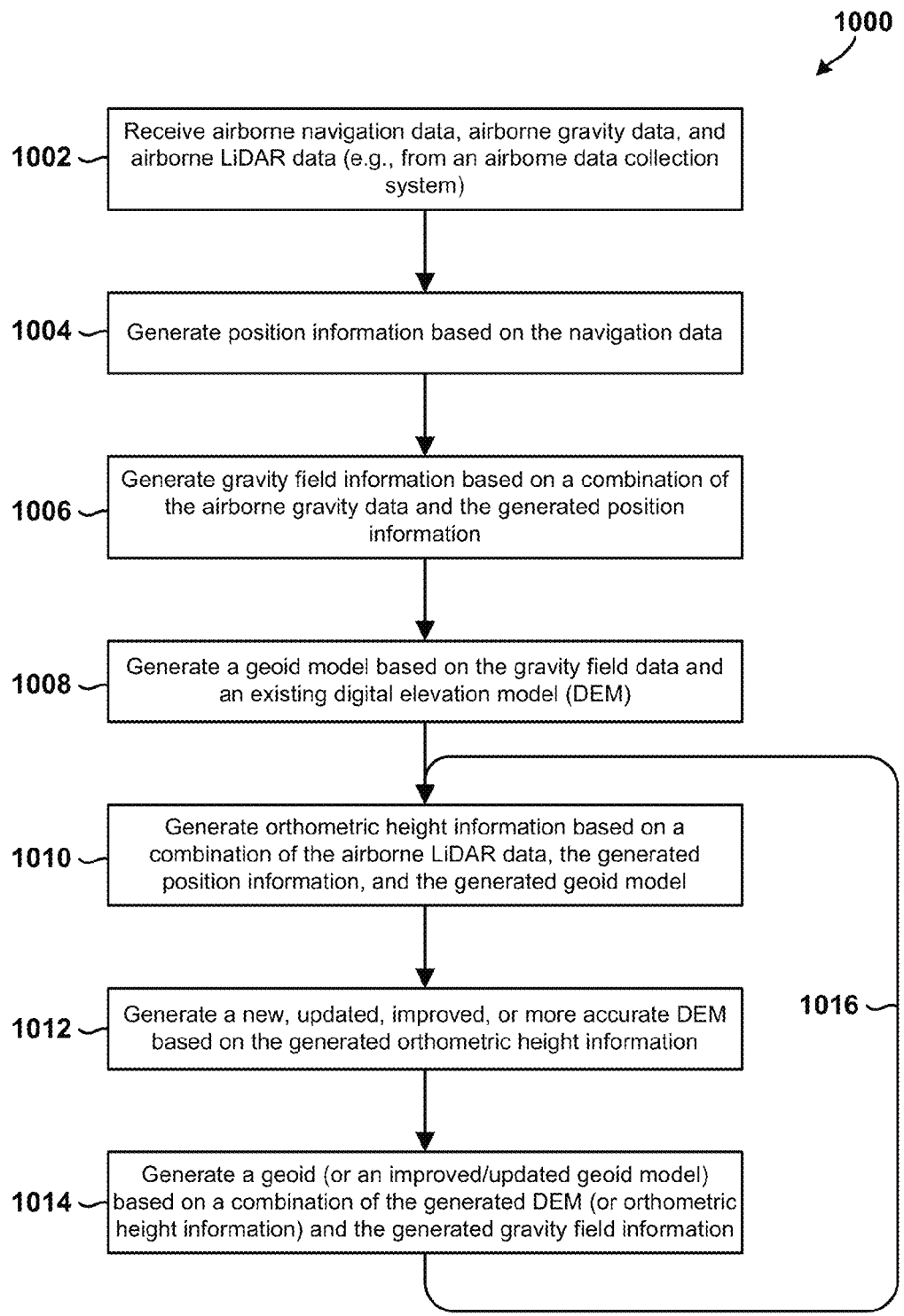
FIG. 10 is a process flow diagram illustrating another method of generating an improved geoid and an improved digital elevation model in accordance with the various embodiments.

FIG. 10 illustrates another method 1000 of computing the geoid in accordance with the various embodiments. Method 1000 may be performed by a processor in a computing device, such as a computing device that implements all or portions of a flood/storm surge modeling system, drainage/water flow system, vertical deformation monitoring system, etc.

In block 1002, the computing device may receive airborne navigation data, airborne gravity data, and airborne LiDAR data (e.g., from an airborne data collection system). In block 1004, the computing device may use the navigation data to generate position information. In block 1006, the computing device may use a combination of the airborne gravity data and the generated position information to generate gravity field information. In block 1008, the computing device may use the gravity field data and an existing digital elevation model (DEM) to generate a geoid or geoid model. In block 1010, the computing device may use a combination of the airborne LiDAR data, the generated position information, and the generated geoid/geoid model to generate orthometric height information. In block 1012, the computing device may use the generated orthometric height information to generate a new, updated, improved, or more accurate DEM. In block 1014, the computing device may use a combination of the generated DEM (and/or orthometric height information) and the generated gravity field information to generate a geoid (or an improved/updated geoid/geoid model).

The geoid generated in block 1014 may more accurate than the geoid generated in block 1008. The computing device may use this more accurate geoid to improve upon the accuracy of the orthometric height information and generate a more detailed DEM and/or improved gravity data (field), any or all of which may be used to further improve the accuracy of the geoid. This creates a feedback loop 1016 in which the DEM (and gravity data in some embodiments) are used to improve the accuracy of the geoid, and the geoid is used to improve the accuracy of the DEM (and gravity data in some embodiments).

Figure 11:
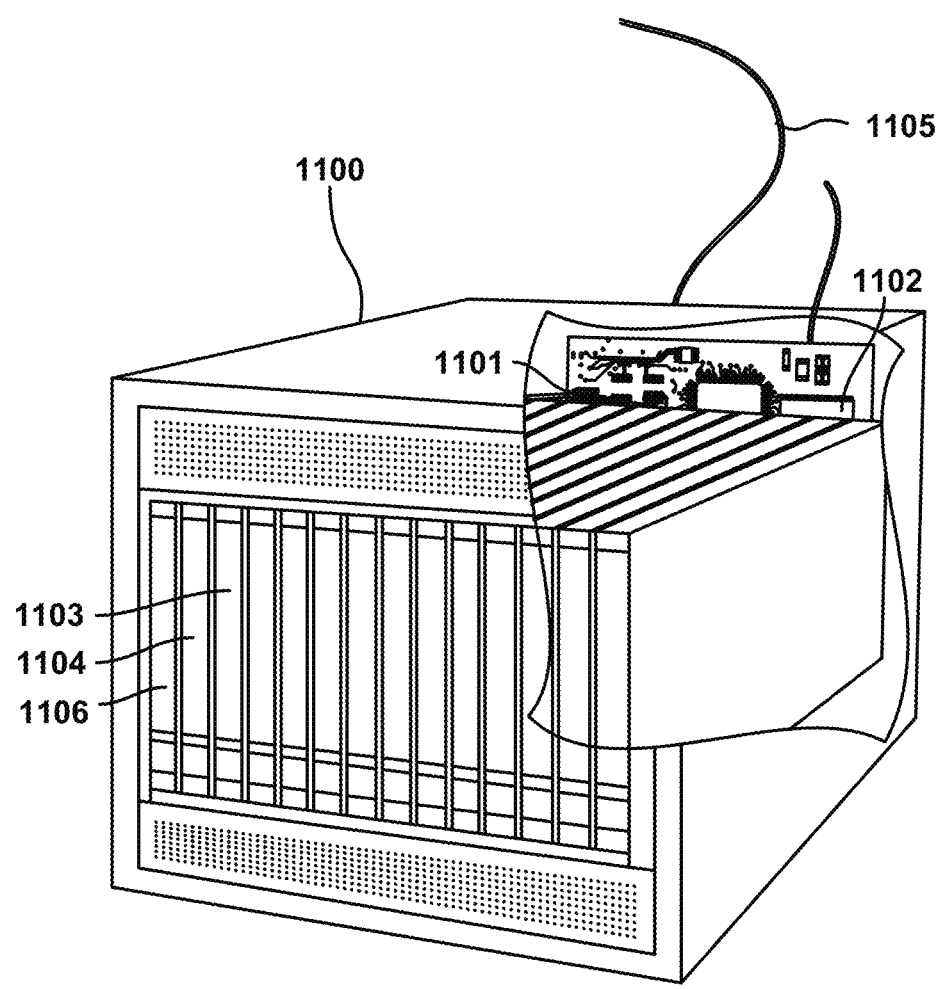
FIG. 11 is a component block diagram of a server computing device suitable for use with an embodiment.

Various embodiments may be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1106 coupled to the processor 1101. The server 1100 may also include network access ports 1104 coupled to the processor 1101 for establishing data connections with a network 1105, such as a local area network coupled to other communication system computers and servers.

The processors 1101 may be any programmable microprocessor, microcomputer or multiple processor chip or chips that can be configured by software instructions (applications) to perform a variety of functions, including the functions of the various embodiments described below. In some mobile devices, multiple processors 1701 may be provided, such as one processor dedicated to wireless communication functions and one processor dedicated to running other applications. Typically, software applications may be stored in the internal memory 1102, 1103 before they are accessed and loaded into the processor 1101. The processor 1101 may include internal memory sufficient to store the application software instructions.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a plurality of microprocessors, one or more microprocessors in conjunction with an IP or CPU core, or any other such configuration. Alternatively, some blocks or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A non-transitory computer readable storage medium having stored thereon processor-executable software instructions configured to cause a processor to perform operations comprising:
   receiving airborne navigation data, airborne gravity data, and airborne LiDAR data;
   generating position information based on the navigation data;
   generating gravity field information based on a combination of the airborne gravity data and the generated position information;
   generating orthometric height information based on a combination of the airborne LiDAR data and the generated position information;
   generating a geoid based on a combination of the generated orthometric height information and the generated gravity field information; and
   displaying a model based on the generated geoid.

2. The non-transitory computer readable storage medium of claim 1, wherein the stored processor-executable software instructions are configured to cause a processor to perform operations further comprising:
   generating updated orthometric height information based on a combination of the LiDAR data, the generated position information, and the generated geoid.

3. The non-transitory computer readable storage medium of claim 2, wherein the stored processor-executable software instructions are configured to cause a processor to perform operations such that the operations of generating updated orthometric height information and generating the geoid based on a combination of the generated orthometric height information and the generated gravity field information are performed repeatedly.

4. The non-transitory computer readable storage medium of claim 1, wherein the stored processor-executable software instructions are configured to cause a processor to perform operations further comprising:
   generating a digital elevation model based on the generated orthometric height information.

5. The non-transitory computer readable storage medium of claim 4, wherein the stored processor-executable software instructions are configured to cause a processor to perform operations such that generating the digital elevation model comprises:
   generating the digital elevation model based on a combination of the generated geoid and the generated orthometric height information.

6. The non-transitory computer readable storage medium of claim 1, wherein the stored processor-executable software instructions are configured to cause a processor to perform operations such that generating the geoid based on a combination of the generated orthometric height information and the generated gravity field information comprises:
   performing a three-space method.

7. The non-transitory computer readable storage medium of claim 6, wherein the stored processor-executable software instructions are configured to cause a processor to perform operations such that performing a three-space method comprises:
   subtracting topographical effects on a gravity anomaly;
   converting the gravity anomaly from a first space to a second space;
   performing downward continuation operations on the gravity anomaly in the second space;
   converting the downward continued gravity anomaly from the second space to a third space;
   performing integration operations on the gravity anomaly in the third space to determine a virtual geoid; and
   converting the virtual geoid to the geoid.

8. The non-transitory computer readable storage medium of claim 7, wherein the stored processor-executable software instructions are configured to cause a processor to perform operations such that the second space is a no-topography space, the third space is a Helmert space, and the virtual geoid is a Helmert cogeoid.

9. The non-transitory computer readable storage medium of claim 1, wherein:
   the stored processor-executable software instructions are configured to cause a processor to perform operations further comprising generating a geoid model based on the gravity field data and an digital elevation, model, and
   the stored processor-executable software instructions are configured to cause a processor to perform operations such that generating the orthometric height information based on a combination of the airborne LiDAR data and the generated position information comprises generating the orthometric height information based on a combination of the airborne LiDAR data, the generated position information, and the generated geoid model.

10. A method of determining a geoid, comprising:
   receiving in a processor of a computing device airborne navigation data, airborne gravity data, and airborne LiDAR data;
   generating position information based on the navigation data;
   generating gravity field information based on a combination of the airborne gravity data and the generated position information;
   generating orthometric height information based on a combination of the airborne LiDAR data and the generated position information;
   generating the geoid based on a combination of the generated orthometric height information and the generated gravity field information; and
   displaying a model based on the generated geoid.

11. The method of claim 10, further comprising:
   generating updated orthometric height information based on a combination of the LiDAR data, the generated position information, and the generated geoid.

12. The method of claim 11, wherein the operations of generating updated orthometric height information and generating the geoid based on a combination of the generated orthometric height information and the generated gravity field, information are performed repeatedly.

13. The method of claim 10, further comprising:
   generating a digital elevation model based on the generated orthometric height information.

14. The method of claim 13, wherein generating the digital elevation model comprises:
   generating the digital elevation model based on a combination of the generated geoid and the generated orthometric height information.

15. The method of claim 10, wherein generating the geoid based on a combination of the generated orthometric height information and the generated gravity field information comprises:
   performing a three-space method.

16. The method of claim 15, wherein performing a three-space method comprises:
  subtracting topographical effects on a gravity anomaly;
  converting the gravity anomaly from a first space to a second space;
  performing downward continuation operations on the gravity anomaly in the second space;
  converting the downward continued gravity anomaly front the second space to a third space;
  performing integration operations on the gravity anomaly in the third space to determine a virtual geoid; and
  converting the virtual geoid to the geoid.

17. The method of claim 16, wherein, the second space is a no-topography space, the third space is a Helmert space, and the virtual geoid is a Helmert cogeoid.

18. The method of claim 10, further comprising generating a geoid model based on the gravity field data and an digital elevation model, wherein generating the orthometric height information based on a combination of the airborne LiDAR data and the generated position information comprises:
  generating the orthometric height information based, on a combination of the airborne LiDAR data, the generated position information, and the generated geoid model.

19. A computing device, comprising:
  a processor configured with processor-executable instructions to perform operations comprising:
    receiving airborne navigation data, airborne gravity data, and airborne LiDAR data;
    generating position information based on the navigation data;
    generating gravity field information based on a combination of the airborne gravity data and the generated position information;
    generating orthometric height information based on a combination of the airborne LiDAR data and the generated position information;
    generating a geoid based on a combination of the generated orthometric height information and the generated gravity field information; and
    displaying a model based on the generated geoid.

20. The computing device of claim 19, wherein the processor is configured with processor-executable instructions to perform operations such that generating the geoid based on a combination of the generated orthometric height information and the generated gravity field information comprises performing a three-space method that includes:
  subtracting topographical effects on a gravity anomaly;
  converting the gravity anomaly from a first space to a no-topography space;
  performing downward continuation operations on the gravity anomaly in the no-topography space;
  converting the downward continued gravity anomaly from the no-topography space to a Helmert space;
  performing integration operations on the gravity anomaly in the Helmert space to determine a Helmert cogeoid; and
  converting the Helmert cogeoid to the geoid.

* * * * *